United States Patent [19]

Kovacs

[11] Patent Number: 5,087,378

[45] Date of Patent: Feb. 11, 1992

[54] PROCESS FOR ENHANCING THE DEWATERABILITY OF WASTE SLUDGE FROM MICROBIOLOGICAL DIGESTION

[75] Inventor: Geza L. Kovacs, Baltimore, Md.

[73] Assignee: Pori, International, Inc., Baltimore, Md.

[21] Appl. No.: 531,059

[22] Filed: May 31, 1990

[51] Int. Cl.$^5$ .............................................. C02F 11/12
[52] U.S. Cl. ................................... 210/742; 210/743; 210/766; 210/770; 210/774; 210/808; 210/609
[58] Field of Search ............... 210/609, 710, 724, 737, 210/742, 743, 751, 761, 766, 770, 774, 808

[56] References Cited

U.S. PATENT DOCUMENTS

| | | | |
|---|---|---|---|
| 1,511,418 | 10/1924 | Maclachlan | 210/710 |
| 2,850,419 | 9/1958 | Torpey | 210/609 |
| 3,155,611 | 11/1964 | Porteous | 210/774 |
| 3,272,740 | 9/1966 | Gitchel et al. | 210/761 |
| 3,289,845 | 12/1966 | Weber | 210/231 |
| 3,359,200 | 12/1967 | Gitchel et al. | 210/761 |
| 3,649,534 | 3/1970 | Schotte | 210/761 |
| 3,697,417 | 10/1972 | Teletzke et al. | 210/609 |
| 3,835,021 | 9/1974 | Lorenz et al. | 210/774 |
| 3,913,500 | 10/1975 | Paccione et al. | 110/224 |
| 3,922,221 | 11/1975 | Rosler et al. | 210/737 |
| 4,067,801 | 1/1978 | Ishida et al. | 210/603 |
| 4,119,495 | 10/1978 | Belyaev et al. | 210/609 |
| 4,221,661 | 9/1980 | Schimuzu et al. | 210/721 |

OTHER PUBLICATIONS

Mayer, "Membrane Press Sludge Dewatering," American Filtration Society, 2nd Annual Meeting, Pittsburgh, Pa., Mar. 27-29, 1989.

Primary Examiner—Thomas Wyse
Attorney, Agent, or Firm—Venable, Baetjer, Howard & Civiletti

[57] ABSTRACT

The present invention is concerned with a process for enhancing the dewaterability of a waste sludge having a substantial content of water-retaining cellular structure arising from microbiological action and having a solids content of at least fifteen percent by weight. The pH of the sludge is adjusted to 4.0 or less, the sludge is subjected to heat treatment to significantly enhance its filterability, the pH is again adjusted to near neutral, the sludge is subjected to a second heat treatment step, and the sludge is filtered to a final solids content in excess of about fifty-five percent by weight.

10 Claims, No Drawings

PROCESS FOR ENHANCING THE DEWATERABILITY OF WASTE SLUDGE FROM MICROBIOLOGICAL DIGESTION

FIELD OF THE INVENTION

The present invention is concerned with a process for rendering fairly high solids waste sludges with substantial contents of water retaining cellular structures arising from microbiological action, amenable to further mechanical dewatering.

BACKGROUND OF THE INVENTION

The treatment of aqueous waste streams with a significant content of organic matter has been and continues to be a matter of substantial technological interest. These waste streams may be general sewage or they may be from various industrial operations such as food processing or paper production.

A very old but still valid approach to this problem is to reduce the dissolved and colloidally suspended organic content of the waste stream through microbiological action. This typically involves digestion of this organic matter by aerobic fermentation, anaerobic fermentation or both. Such microbiological activity generates a gelatinous material commonly referred to as activated sludge. It has a high tightly bound water content.

The disposal of such sludges is also a matter of technological concern. The two primary goals have been to terminate the biological activity and to reduce the water content. Both have been addressed by either the treatment of the sludge with lime (calcium hydroxide) or the heat treatment of the sludge with or without the addition of an oxygen bearing gas or an oxidizing agent. Neither approach has been entirely satisfactory.

The lime treatment is expensive and actually significantly increases the amount of sludge with which one must deal. A fairly high loading of lime, typically between about 150 and 550 pounds per ton of dry sludge solids, is required for dewatering enhancement. The expense of such a treatment involves not only the costs of the lime itself but also the substantial labor costs in handling such a large quantity of additive. Furthermore, effective dewatering also requires the addition of an inorganic metal salt, typically ferric chloride, at loadings commonly between about 40 and 125 pounds per ton of dry sludge solids. Most of the lime and all of the ferric chloride usually end up as additional solids in the filter cake thus adding to the amount of solid material of which one must dispose.

In addition, some sludges require even higher loadings of lime for stabilization. An EPA case study has reported a need for as much as 1000 pounds per ton of dry sludge solids to reliably terminate biological activity.

On the other hand, heat treatment has apparently uniformly involved the heating of rather dilute feed streams with typical solids contents between about 3 and 10 weight percent. This heat treatment has almost universally involved the use of some type of heat exchanger to recover some of the heat energy expended in raising the temperature of the very high water content feed stream. Scaling problems are commonly encountered in passing these dilute sludges through such heat exchangers resulting in a frequent need to acid wash the heat exchanger.

Furthermore, two separate operations are usually required to dewater the heat treated sludge. Generally, the heat treated material is fed to a decanter, clarifier or settling tank and then the underflow from this operation is fed to a rotary vacuum filter or a recessed chamber pressure filter.

There are disclosures of feeding a fairly dilute heat treated material directly to a centrifuge for final dewatering. However, such procedures require the addition of a substantial quantity of flocculating polymer.

SUMMARY OF THE INVENTION

The present invention is concerned with a process of enhancing the dewaterability of waste sludge with a substantial content of a water-retaining cellular structure arising from microbiological action by heat treating the sludge at a solids content of at least about 15 weight per cent. It is further concerned with an efficient and convenient procedure for killing the pathogens and odor generating microorganisms present in the sludge by heating a concentrated waste sludge to temperatures higher than can be tolerated by such organisms.

It is preferred to use mild temperatures between about 260° and 390° F. It is further preferred to conduct the heat treatment without the addition of either an oxygen bearing gas or an oxidizing agent. In a particularly preferred embodiment the sludge is acidified or alkalized before the heat treatment and then at least partially neutralized before the heat treatment is ended.

DETAILED DESCRIPTION OF THE INVENTION

The further dewatering of concentrated waste sludges which have a substantial content of organic water binding material is facilitated by heat treating them. In general these waste sludges have solids contents of about 15 weight percent or greater, preferably between about 20 and 30 weight percent. The organic water binding material is typically a cellular structure which has been built up as the result of the microbiological activity involved in the activated sludge process, i.e. the process of reducing the biological oxygen demand (BOD) and chemical oxygen demand (COD) of an aqueous waste stream by aerobic digestion, anaerobic digestion or both. This aqueous waste steam may be from a multitude of sources including but not limited to municipal sewerage and industrial operations such as paper making, food processing and organic chemical synthesis. Typical organic chemical syntheses include dyestuff manufacture and conversion of petroleum feedstocks to chemical intermediates. In a preferred process the concentrated sludge has been dewatered to the point that significant further water removal can not be effected with a recessed chamber filter with a 100 psi filter pressure.

The concentrated waste sludge may have been obtained through the use of polyelectrolyte flocculants. These flocculants are typically high molecular weight polyacrylamides with various anionic or cationic pendant groups obtained by derivitization or co-polymerization. They are commonly used at loadings between about 10 and 15 pounds per ton of dry sludge solids. For many common waste sludges there is no practical way to obtain solids concentrations of unheat-treated waste sludges above about 6 weight percent without the us of such flocculants. However, it is believed that the presence of such flocculants in the concentrated waste sludges treated in the present procedure neither enhances or inhibits the enhanced dewaterability obtained. Such flocculants simply provide a convenient route to the starting material of the present process.

The heat treatment should be sufficient to at least partially break down the cellular structure which binds the water content. It is believed that the heat treatment at least partially effects this breakdown by denaturing the proteins of this cellular structure. It is preferred to use temperatures in excess of about 260° F., preferably between about 270° and 390° F. and most preferably between about 280° and 366° F. At too low a temperature excessive times are required to obtain a significant improvement in dewaterability. At a sufficiently low temperature no improvement is observed over a reasonable treatment period. On the other hand, excessively high temperatures may cause an undesirable degree of redissolution of materials which increase the COD and BOD of the effluent from the dewatering process. Furthermore, the improvement in dewaterability by heat treatment beyond a certain point yields only minimal improvements in dewaterability and is unnecessarily expensive in terms of both thermal energy and, if excessively high temperatures are involved, capital equipment and maintenance costs to deal with the high pressures needed to keep water liquid at such temperatures. In this regard, in the present invention it is preferred to operate at pressures of 200 psig or less, more preferably at 150 psig or less.

The effect of heat treatment ma be substantially accelerated by adjusting the pH of the concentrated waste sludge to a strongly acidic or alkaline value. It is particularly preferred to adjust the pH to a value of about 3 or more points from neutral. It is especially preferred to operate on the acidic side and even more preferred to operate at pH values of about 3 or less. Operating on the alkaline side typically results in the generation of substantial amounts of ammonia and may require the use of a completely closed system to avoid the loss of this ammonia and a consequent drop in pH. Furthermore this ammonia generation tends to remove nitrogen values from the ultimately recovered cake and poses an additional disposal problem. Either a gas waste stream is generated or dissolved ammonium is added to the effluent when the treated sludge is neutralized.

It is also preferred to substantially neutralize an acidified or alkalized concentrate sludge before mechanically dewatering it. It is particularly preferred to bring the pH value within about three points, more preferably two points, or less of neutral. This neutralization step results in the precipitation of both organic materials and metal salts which are soluble at the more extreme pH values. Since the effluent from the dewatering of the concentrated waste sludge is typically recycled to the initial treatment plant, the organic materials dissolved in the effluent will lead to the generation of more sludge. Typically each pound of BOD will generate 0.6 pounds of activated sludge. On the other hand the metals content of the primary waste stream being processed through the initial treatment plant will continue to increase as it is mixed with this recycle effluent if this effluent has an increased metals content.

It is further preferred to utilize a basic calcium compound to neutralize the acidified concentrated waste sludge. Calcium is a preferred cation because of its limited water solubility and because basic calcium compounds are relatively inexpensive. A particularly advantageous neutralizing agent is calcium hydroxide which is readily available as slaked lime or can be readily obtained by slurring quick lime in water.

It is advantageous to extend the heat treatment for some period after the neutralization. If the heat treatment is discontinued before the neutralization is complete, a significant portion of the enhanced dewaterability of the concentrated waste sludge may be lost. It is particularly preferred to heat treat the neutralized concentrated sludge for at least about ten minutes.

The heat treatment may be effected using any heat transfer means which can reliably and effectively raise the temperature of the concentrated waste sludge into the required range while maintaining it under pressure. It is preferred to avoid head transfer means which involve the concentrated waste sludge contacting a solid surface hotter than itself. This material typically displays a strong tendency to deposit scale on such surfaces thereby substantially inhibiting further heat transfer, sometimes to the extent that the coefficient of thermal transfer becomes essentially zero. It is further preferred that the heating means involve means for agitating the concentrated waste sludge because such sludges have a poor heat transfer coefficient (one EPA study reports an inverse relationship between this coefficient and the sludge solids content with a dramatic increase in the rate of diminution of this coefficient at solids contents of 6 percent or greater). It is particularly preferred to effect the heat transfer by contacting the concentrated waste sludge with a hot fluid and it is especially preferred to use pressurized steam. This steam can be injected into the air space immediately adjacent to the sludge or preferably it can be injected into the body of the sludge. Both the high viscosity and the low coefficient of heat transfer of these sludges will make the use of conventional heat exchangers very impractical, if not impossible.

The concentrated waste sludge should be heat treated under sufficient pressure to keep its water content substantially liquid. Otherwise it becomes very difficult if not impossible to raise the temperature above the boiling point of the water. In going from the liquid to the gaseous state water absorbs a tremendous amount of heat, thus making it extremely uneconomical to attempt to simply dewater by boiling off the water.

The length of time at the heat treatment temperature needed to effect a substantial enhancement of dewaterability of given concentrated waste sludge depends primarily on the temperature of the treatment and the pH at which the treatment was effected. Generally for most sludges the optimum enhancement is achieved in between about 4 and 5 hours and this can be shortened to about 40 minutes or less by conducting the heat treatment at high or low pH values. However, significant benefit can be obtained in about two hours, or fifteen minutes with simultaneous pH adjustment.

There appears to be a linear relationship between the pH of the concentrated waste sludge and the log of the time necessary to obtain irreversible enhanced dewaterability at pH values less than neutral. The enhanced dewaterability is considered irreversible when it is not significantly degraded by subjecting treated material to either shear or aging before filtration. It is believed that a family of curves can be readily developed, one curve for each treatment temperature in the appropriate range, relating the log of the treatment time to develop irreversibility to the pH of the material being treated. Such a curve for treatment with 100 psig steam (338° F.) has been developed. This is defined by the equation $y = bm^x$ wherein y is the treatment time to irreversibility in minutes, x is the pH of the concentrated waste sludge, bis 9.986 and m is 1.894. This equation fit the measured data with a correlation coefficient of 0.993.

The heat treatment acceleration obtained by the use of extreme pH values is of primary interest for continuous processing of the concentrated waste sludge. Many waste treatment plants operate at volumes such that the processing of waste sludge is conveniently done on a batch basis. In such situations the economic balance between the cost of a longer heat treatment and the additional cost of acidification or alkalization followed by neutralization may dictate whether the acceleration procedure is desirable. As the throughput required of the sludge treatment facility increases a bias toward acceleration develops; the sam throughput can be obtained in a smaller and therefore less expensive heat treatment system with shorter residence time. As the heat treatment time increases the batch size for each cycle must be that much larger to obtain the same throughput.

The enhancement in dewaterability can be conveniently evaluated in terms of filtration time and cake solids. A decrease in filtration time and an increase in solids content both reflect an enhancement in dewaterability. It is preferred to use treatment conditions such that the filtration time is less than about two hours, preferably less than about one hour and even more preferably less than about thirty minutes. In fact filtration times of less than about five minutes and even less than two minutes can be readily obtained. Such rapid filtration times are a good indicator that optimum dewaterability has been approached, even if the capacity of commercially available pumps limit the ability to take full advantage of them.

The heat treatment can readily yield concentrated waste sludges which can be readily dewatered to solids contents in excess of about 30 weight percent. It is preferred to use conditions which yield cake solids in excess of about 45 weight percent, more preferably in excess of about 55 weight percent, most preferably in excess of about 60 weight percent.

The enhanced dewaterability of the concentrated waste sludge can be further evaluated in terms of its aging behavior and sensitivity to shear. A sludge which has not been optimally conditioned will display a significant increase in filtration time and a significant decrease in cake solids upon aging a significant period of time after heat treatment. A typical evaluation period is overnight or about 16 hours.

Furthermore, subjecting a concentrated waste sludge which has not been optimally conditioned to substantial shear will cause it to lose a substantial degree of its enhanced dewaterability. A convenient evaluation technique is to vigorously stir a conditioned sludge at 140° F. for about thirty minutes.

It is especially preferred to sufficiently condition the concentrated waste sludge such that it does not display significant sensitivity to either aging or significant shear. For the purposes of this invention, the enhanced dewaterability of such a treated concentrated waste sludge is characterized as irreversible.

The filtration time and cake solids obtainable may be conveniently evaluated using a recessed chamber membrane pressure filter. In the work reported in this application (unless otherwise indicated), the filtration was done at a filtration pressure of 100 psi; and a membrane squeeze pressure of 175 psi. The concentrated waste sludge was filtered at a temperature of 140° F. The filter cloth was a $43 \times 80$ 9 oz./yd$^2$ polypropylene monofilament sateen weave cloth with a calendared finish, an air porosity between about 60 and 100 cfm and a thread count of $75 \times 32$. However, the precise nature of the filter cloth was not considered critical so long as it did not blind. It was believed that the filtration was basically effected by the cake as it built up on the cloth. The actual device used was a half of a filter set known as a bomb filter and commonly used for laboratory evaluation.

The recessed chamber membrane pressure filter is well known to those skilled in the art. An extensive review of its use in dewatering is contained in the paper "Membrane Press Sludge Dewatering" presented by Dr. Ernest Mayer at the Second Annual Meeting of the American Filtration Society in Pittsburgh, Pa. in March of 1989. Its initial development for dewatering washed pigment cake is reported in U.S. Pat. No. 3,289,845, incorporated herein by reference. Filters of this type are available from a number of suppliers including Klinkau GmbH of Marktoberdorf-Leuterschach, West Germany and Lenser America of Lakewood, N.J.. This type of filter is basically a recessed chamber plate filter which contains an inflatable membrane for squeezing the filter cake after the initial pressure filtration has been essentially completed.

Although the dewaterability of the conditioned sludge was evaluated on a recessed chamber pressure membrane filter, it can be practically dewatered on a wide variety of mechanical dewatering devices including centrifuges and rotary vacuum filters. Of course, the results obtained will depend somewhat on the nature of the dewatering device. Currently the recessed chamber pressure membrane filters are the most preferred devices.

The following examples more fully illustrate specific embodiments of the invention.

EXAMPLE 1

Enhancing the Dewaterability of Concentrated Primary and Secondary Municipal Sewerage Sludge by Heat Treatment A concentrated waste sludge, which was obtained by filtration on a recessed chamber plate filter of a mixture of the primary and secondary sludge generated in a municipal waste treatment plant which utilizes aerobic digestion, was heat treated for various times to improve its dewaterability. The concentrate was obtained by adding between 10 and 15 pounds per dry ton of solids of a polyacrylamide based polyelectrolyte flocculent to the sludge and then filtering it to a solids content of about 29 weight percent. This concentrated waste sludge had a pH of about 5.2 and an ash content of about 22.7 weight percent.

Four hundred gram samples of this concentrated waste sludge were heat treated in an autoclave at a pressure of 100 psig using 100 psig steam for varying periods of time. The steam was injected directly into the body of the sludge for between about four and six minutes and thereafter it was provided to the air space around the sample. Temperature profiles had established that this direct injection was sufficient to heat the sample to obtain a temperature of about 320° F. The treatment time was measured from completion of this direct injection to steam termination. It took some portion of this treatment, which varied from run to run, for the temperature of the sludge to equilibrate to the 338° F. temperature of 100 psig steam. The heat treatment was discontinued by gradually releasing the pressure and this cool down period was not included in the treatment time.

The dewaterability was tested by mixing a fifty gram sample with 50 mililiters of water and feeding this mixture to a test filtration apparatus known as a bomb filter which consisted of one half of a recessed chamber membrane pressure filter set and which had a capacity of approximately 250 mililiters. A filtration pressure of 100 psi was used followed by a squeeze pressure which was gradually increased to 175 psi. The sludge was at a temperature of about 140° F. during the filtration.

The evaluation criteria were filtration time until gas could be observed passing through the filter (the filtration was driven with pressurized nitrogen), the percent solids achieved after squeezing, the effect of overnight aging and the effect of shear (applied by thirty minutes mixing with a household hand cake mixer). The thickness of the filter cake after squeezing was also observed. The results are reported in Table 1.

The cakes which were obtained did not initially exhibit or develop objectionable odors, even after prolonged storage periods. This was taken as an indication that the heat treatment had inactivated or killed any microorganisms present in the concentrated waste sludge.

EXAMPLE 3

Dewaterability of Heat Treated Acidified and Neutralized Concentrated Municipal Sewerage Sludge from Anaerobic Digestion A concentrated waste sludge, which was obtained by centrifuging a municipal sewerage sludge from an anaerobic digestion, was acidified, heat treated for about one hour, neutralized, further heat treated for about fifteen minutes and then its dewaterability was evaluated in the manner similar to that described in Example 1. The initial sludge was modified by the addition of between about 10 and 15 pounds per dry ton of sludge solids of a polymer flocculent of the type described in Example 1 and then it was centrifuged to a solids content of about 20.7 weight percent which had an ash content of 42.3 weight percent. This sludge had a pH value of about 8.45.

Six hundred gram samples were acidified to a pH value of about 2 by stirring in an appropriate amount of concentrated sulfuric acid. They were then heat treated in an autoclave maintained at 100 psig by the injection of 100 psig steam into the airspace around the specimen for about one hour. Temperature profiles indicated that it took approximately forty minutes for each specimen to reach a temperature in excess of about 310° F. and

TABLE 1

Straight Heat Treatment of Concentrated Waste Sludge From Aerobic Digestion of Municipal Sewerage

| Treatment Time (in hours) | As Treated Filtration | | | Sheared Filtration | | | Aged Filtration | | |
|---|---|---|---|---|---|---|---|---|---|
| | Filtration Time (in minutes) | Cake Solids (in %) | Cake Thickness (in mm) | Filtration Time (in minutes) | Cake Solids (in %) | Cake (in mm) | Filtration Time (in minutes) | Cake Solids (in %) | Cake Thickness in mm) |
| 2 | 9 | 53.6 | 9 | not filterable | | | 24 | 52.8 | 9 |
| 4 | 2 | 63.2 | 7 | 15 | 60 | 7 | 8¾ | 63.8 | 7 |
| 5 | 1 | 65.4 | 6.5 | 16 | 65.4 | 6 | 1¼ | 66.6 | 6 |

EXAMPLE 2

Acid Acceleration of the Heat Treatment of Primary and Secondary Municipal Sewerage Sludge Four hundred gram samples of the concentrated waste sludge described in Example 1 were acidified to a pH value of about 2 by stirring in an appropriate amount of concentrated sulfuric acid, heat treated for varying periods of time using 100 psi steam in the manner described in Example 1 and then evaluated as described in Example 1. The results are reported in Table II.

that the specimen did not quite reach the 338° F. temperature of the 100 psig steam.

Each specimen was then neutralized by stirring in the appropriate amount of lime. In one case, the pH was taken to a value of 6.7 and in the other case to a value of 9.0.

The neutralized samples were then heat treated for about fifteen minutes by injecting 100 psig steam into the free airspace of an autoclave with an overhead agitator value set at 100 psig. Temperature profiles indicated that the specimens reached a temperature between about 245° and 270° F. at the conclusion of the

TABLE 2

Dewaterability of Acidified and Heat Treated Concentrated Waste Sludge from Aerobic Digestion of Municipal Sludge

| Treatment Time (in minutes) | As Treated Filtration | | | Sheared Filtration | | |
|---|---|---|---|---|---|---|
| | Filtration Time (in minutes) | Cake Solids (in %) | Cake Thickness (in mm) | Filtration Time (in minutes) | Cake Solids (in %) | Cake Thickness (in mm) |
| 20 | 37 | 44.4 | 8 | Not filterable | | |
| 30 | 11 | 52.3 | 8 | Not filterable | | |
| 40 | 11 | 65.0 | 6.5 | 5 | 62.4 | — |

As in Example 1, the cakes which were obtained were free of objectionable odors and did not develop such odors indicating a termination of biological activity.

fifteen minute treatment.

The dewaterability of the concentrated waste sludge specimens was evaluated after treatment, after being mixed for thirty minutes with an overhead agitator and after aging overnight. In each case, a seventy five gram specimen was fed to the apparatus described in Example 1 (140° F. filtration temperature, 100 psi filtration pressure and 175 psi squeeze pressure). All six runs (two neutralization pH values each subjected to three post treatment conditions) gave approximately the same filtration time of between 2 and 3 minutes and cake solids of around 64 percent. The ash content of the solids was between about 55 and 65 weight percent As in Examples 1 and 2, the cakes obtained did not display and did not later develop any objectionable odors thus evidencing an absence of biological activity.

EXAMPLE 4

Enhancing the Dewaterability of Concentrated Municipal Sewerage Sludge from Anaerobic Digestion by Acidification and Heat Treatment A concentrated waste sludge, which was obtained in the manner as in Example 3 and which had a solids content of 20.7 weight percent with an ash content of 38.3 weight percent, was acidified, heat treated for one hour, neutralized, heat treated for 15 minutes and evaluated in the manner described in Example 3. The acidification was effected by stirring in an appropriate amount of concentrated sulfuric acid to yield a pH value of about 2. The heat treatment was effected by injecting 100 psig steam into the airspace of an autoclave with a steam trap valve set at 100 psig. The neutralization was effected by stirring in an appropriate amount of lime with a household hand cake mixer to give a pH value of about 7.7 (the cake mixer was used to test the shear sensitivity of the treated material).

The treated material filtered in about two minutes and yielded a final squeezed cake of 10.5 mm thickness with a solids content of about 66 weight percent having an ash content of about 54 weight percent. The filter feed had a suspended solids content of about 11 weight percent. Essentially, the same results were obtained from material which was aged overnight.

As in Examples 1, 2 and 3, the cakes obtained did not display or develop any objectional odors thus evidencing an absence of biological activity.

However, when the same material was only heat treated for approximately 30 minutes, the acidified material could not be filtered at a filtration pressure of 100 psi. A temperature profile indicated that a maximum temperature of 288° F. was reached at the end of this thirty minute treatment. Only about 20 ml of effluent were obtained after seven minutes of filtration and the run was terminated.

EXAMPLE 5

Enhancing the Dewaterability of Concentrated Primary and Secondary Municipal Sewerage Sludge from Aerobic Digestion by Acidification and Heat Treatment and Determining the Result of Residual Chemical Distribution A concentrated waste sludge, which was obtained in the same manner as Example 1 and which had a solids content of about 20.9 weight percent having an ash content of 18.5 weight, was acidified, heat treated for either ¾ of an hour or one hour, neutralized, heat treated for 15 minutes and evaluated the manner described in Example 1. The acidification was effected by stirring in an appropriate amount of concentrated sulfuric acid to yield a pH value of about 2. The heat treatment was effected by injecting 90 psig (about 331° F.) steam into the airspace of an autoclave with a steam trap value set at 90 psig. The neutralization was effected by stirring in an appropriate amount of lime to give a pH value of about 5.5. The results are reported in Table 3.

TABLE 3

| | Dewaterability of Acidified Concentrated Waste Sludge from Aerobic Digestion of Municipal Sewerage | | | | | |
|---|---|---|---|---|---|---|
| | As Treated Sample | | | Sample Aged Overnight | | |
| Treatment Time (in minutes) | Filtration Time (in minutes) | Cake Solids (in %) | Cake Thickness (in mm) | Filtration Time (in minutes) | Cake Solids (in %) | Cake Thickness (in mm) |
| 45 | 6.5 (1.6)[1] | 44.8 (53.3) | 14 (12) | 20.5 (12.7) | 43.6 (48.6) | 13 (12) |
| 60 | 1 (1.3) | 57.7 (63.8) | 9.5 (9) | — (2.5) | — (61.1) | (9) |

[1]Values in parenthesis are for filtration at 165° F. and a squeeze pressure of 225 psi as opposed to the 140° F. filtration temperature and 175 psi squeeze pressure of the preceding values.

Table 3 illustrates the development of optimum properties as the time at temperature is extended. A substantial improvement in dewaterability is already observed after the shorter treatment period but further improvement is clearly obtainable both in terms of percent solids and in terms of resistance to aging. The latter is clearly important in the event that it is not possible to immediately dewater the treated material.

The filter cakes obtained had ash contents, based on dry solids, of about 33 weight percent and the filter feed had a suspended solids content between about 8 and 9 weight percent.

A detailed chemical analysis of the initial concentrated waste sludge and the filter cake and the filtrate of the forty five minute treatment followed by the 140° F. filtration with the 175 psi squeeze was recorded in Table 4.

TABLE 4

| A Chemical Analysis of a Concentrated Waste Sludge and the Dewatering Products Obtained by Filtration at 140° F. After Heat Treatment with Acidification and Neutralization | | | | |
|---|---|---|---|---|
| | Amount of Material in Concentrated Waste | % of Material Accounted for | % of Material in the Cake | % of Material in the Filtrate[2] |
| NH$_3$ as N | 0.33 wt % | 50.5 | 8.7 | 41.8 |
| Total Kjeldahl N as N | 1.3 wt % | 65.6 | 37.9 | 27.7 |
| Phosphate Total as P | 0.4 wt % | 82.9 | 80.0 | 2.9 |
| Total Aluminum | 0.23 wt % | 98.6 | 97.1 | 1.4 |
| Total Cadmium | 1.8 ppm | 80.2 | 80.2 | — |
| Total Chromium | 50 ppm | 94.3 | 91.3 | 3 |

TABLE 4-continued

A Chemical Analysis of a Concentrated Waste Sludge and the Dewatering
Products Obtained by Filtration at 140° F. After Heat Treatment
with Acidification and Neutralization

|  | Amount of Material in Concentrated Waste | % of Material Accounted for | % of Material in the Cake | % of Material in the Filtrate[2] |
|---|---|---|---|---|
| Total Copper | 67 ppm | 98.0 | 97.0 | 1.0 |
| Total Iron | 0.22 wt % | 88.6 | 75.8 | 12.9 |
| Total Lead | 21 ppm | 94.4 | 90.5 | 3.9 |
| Total Nickel | 7 ppm | 47.6 | 43.3 | 4.3 |
| Total Zinc | 250 ppm | 44.1 | 42.7 | 1.4 |

[2]The filtrate also has a C.O.D. of 28000 mg/l

EXAMPLE 4

Dewaterability of Acidified and Neutralized Heat Treated Concentrated Primary and Secondary Municipal Sewerage Sludge A concentrated waste sludge, which was obtained by filtration on a belt filter of a mixture of the primary and secondary sludge generated in a municipal waste treatment plant which utilizes aerobic digestion, was acidified, heat treated, neutralized, and further heat treated to improve its dewaterability. The concentrate was obtained by adding between 10 and 15 pounds per dry ton of solids of a polyacrylamide based polyelectrolyte flocculent to the sludge and then filtering it to a solids content of about 24.5 weight percent. This concentrated waste sludge had an ash content of about 27.4 weight percent.

A six hundred gram sample of this concentrated waste sludge was acidified to a pH value of about 2 by stirring in an appropriate amount of concentrated sulfuric acid.

It was then heat treated in an autoclave at a pressure of 100 psig using superheated steam for one hour. The steam was injected into the air space around the sample. A temperature profile indicated that a temperature of 330° F. was reached after about forty minutes.

The sample was then neutralized to a pH value of about 5.9 by stirring it with an appropriate quantity of lime slurried in water.

The neutralized sample was heat treated for fifteen minutes with 100 psig steam in an autoclave with a steam trap valve set at 100 psig. A temperature profile showed the sample reaching a temperature of about 260° F. at the conclusion of the treatment period.

The dewaterability was tested by mixing a fifty gram sample with 50 mililiters of water and feeding this mixture to a test filtration apparatus known as a bomb filter which consisted of one half of a recessed chamber membrane pressure filter set and which had a capacity of approximately 250 mililiters. A filtration pressure of 100 psi was used followed by a squeeze pressure which was gradually increased to 175 psi. The sludge was at a temperature of about 140° F. during the filtration.

The filtration was completed in about 2 minutes and a solids content of about 64.6 weight percent was obtained after squeezing. The filter cake had a half chamber thickness (as described in Example 1 the test apparatus was one half of a filter set) of 11 mm and an ash content of about 36.7 weight percent.

This filter cake did not exhibit an objectionable odor either as filtered or after aging at room temperature for an extended period. This indicated that all biological activity had been terminated by the heat treatment.

EXAMPLE 7

A study was conducted to relate the pH of the concentrated waste sludge to the temperature needed to achieve irreversibility, as measured by insensitivity to overnight aging and shear. The material described in Example 1 was heat treated as in Example 1 except that in most cases the heat treatment was proceeded by acidification by stirring in an appropriate amount of concentrated sulfuric acid and was followed by a neutralization to a pH value about 5.5 by stirring in an appropriate amount of lime slurry. The neutralized material was then heat treated for about fifteen minutes with 100 psig steam in an autoclave with a steam trap valve set at 100 psig. The neutralized material reached a temperature of between 260° and 300° F. in this fifteen minute period. The dewaterability was evaluated by filtration in accordance with the technique described in Example 1. The results were recorded in Table 4.

TABLE 5

A Correlation of Treatment Time to Treatment pH to Achieve Irreversibility

| Treatment pH | Treatment Time (in minutes) |
|---|---|
| 1[3] | 20 |
| 2 | 40 |
| 3 | 60 |
| 4 | 120 |
| 5 | 300 |

[3]projected value

What is claimed is:

1. A process for enhancing the dewaterability of concentrated waste sludges which have a substantial content of a water-retaining cellular structure arising from microbiological action and which have a solids content greater than about 15 weight percent comprising:
   1) adjusting the pH of said sludge to a value of 4 or less;
   2) heat treating said sludge without the addition of an oxygen-bearing gas or oxidizing agent at a temperature between about 260° and 390° F. for a sufficient time to significantly enhance its filterability; and
   3) readjusting the pH of said sludge to within 2 points of neutral and heat treating this neutralized or partially neutralized sludge at a temperature between about 260° and 390° F. for a sufficient time to maintain its enhanced filterability.

2. The process of claim 1 wherein the time at temperature is sufficient that a fifty gram sample of the concentrated waste sludge when mixed with an equal weight of water can be filtered at 140° F.
   a) to a solids content in excess of about 55 weight percent;

b) in less than about 30 minutes;
using a recessed chamber membrane pressure filter with a filtration pressure of 100 psi and a squeeze pressure of 175 psi.

3. The process of claim 1 wherein the concentrated waste sludge is subjected to a temperature between about 270° and 390° F. by direct contact with pressurized steam.

4. The process of claim 3 wherein the steam is injected into the body of the concentrated waste sludge to bring it up to the treatment temperature.

5. The process of claim 3 wherein the time at temperature is sufficient that the dewaterability of the concentrated waste sludge is not significantly effected by subjecting the heat treated material to substantial shear.

6. The process of claim 1 wherein the sludge is heat treated as unitary mass.

7. The process of claim 1 wherein the pH readjustment is effected with an ionic calcium compound.

8. The process of claim 7 wherein the pH readjustment is effected with calcium hydroxide.

9. A process of dewatering relatively high solids content waste sludges while minimizing the C.O.D. and B.O.D. load of the resultant effluent, said sludges having a solids content greater than about 15 weight percent and a substantial content of a water retaining cellular structure arising from microbiological action which does not permit significant further dewatering by a simple room temperature filtration on a recessed chamber filter at a filtration pressure of 100 psi, comprising the steps of:
1) adjusting the pH of said sludge to a value of less than about 4;
2) heat treating the acidified sludge at a temperature between about 290° and 370° F. by direct contact with pressurized steam for a period between about 15 minutes and three hours sufficient that the ultimate dewaterability of the concentrated waste sludge is not significantly effected by subjecting the heat treated neutralized material to substantial shear;
3) neutralizing the heat treated sludge to a pH greater than about 5 with a basic calcium compound;
4) heat treating the neutralized sludge at a temperature of at least about 260° F. in excess of about 5 minutes; and
5) filtering the heat treated neutralized sludge to a water content of less than about 55 weight percent in less than about two hours.

10. The process of claim 9 wherein the minimum heat treatment time and the pH of the concentrated waste sludge are correlated in accordance with the formula $y = bm^x$ wherein y is the treatment time in minutes, x is the pH of the sludge during heat treatment, b is 9.986 and m is 1.894.

* * * * *